(12) United States Patent
Marin et al.

(10) Patent No.: US 10,042,182 B2
(45) Date of Patent: Aug. 7, 2018

(54) METHOD FOR PROVIDING TO A WEARER A CUSTOMIZED PROGRESSIVE SPECTACLE OPHTHALMIC LENS

(71) Applicant: Essilor International, Charenton-le-Pont (FR)

(72) Inventors: Gildas Marin, Charenton-le-Pont (FR); Martha Hernandez Castaneda, Charenton-le-Pont (FR); Laurent Calixte, Charenton-le-Pont (FR)

(73) Assignee: Essilor International, Charenton-le-Pont (FR)

(*) Notice: Subject to any disclaimer, the term of this patent is extended or adjusted under 35 U.S.C. 154(b) by 38 days.

(21) Appl. No.: 15/037,964

(22) PCT Filed: Aug. 27, 2014

(86) PCT No.: PCT/EP2014/068191
§ 371 (c)(1),
(2) Date: May 19, 2016

(87) PCT Pub. No.: WO2015/074777
PCT Pub. Date: May 28, 2015

(65) Prior Publication Data
US 2016/0306191 A1    Oct. 20, 2016

(30) Foreign Application Priority Data
Nov. 25, 2013  (EP) ..................................... 13306605

(51) Int. Cl.
*G02C 7/02*   (2006.01)
*G02C 7/06*   (2006.01)
*G02C 13/00*  (2006.01)

(52) U.S. Cl.
CPC ............. *G02C 7/027* (2013.01); *G02C 7/028* (2013.01); *G02C 7/063* (2013.01); *G02C 7/065* (2013.01); *G02C 13/005* (2013.01); *G02C 2202/22* (2013.01)

(58) Field of Classification Search
CPC ........ G02C 7/027; G02C 7/028; G02C 7/024; G02C 7/061; G02C 7/063; G02C 7/065; G02C 2202/22; G02C 13/005
USPC .......................... 351/159.74, 159.75, 159.76
See application file for complete search history.

(56) References Cited

U.S. PATENT DOCUMENTS

| 2010/0145489 A1 | 6/2010 | Esser et al. |
| 2010/0296053 A1 | 11/2010 | Marin et al. |
| 2010/0296055 A1* | 11/2010 | Esser ................... A61B 3/0025 351/204 |

(Continued)

FOREIGN PATENT DOCUMENTS

| DE | 10 2011 009 473 | 11/2011 |
| DE | 10 2010 049 168 | 4/2012 |
| EP | 2 202 560 | 6/2010 |

*Primary Examiner* — Jordan Schwartz
(74) *Attorney, Agent, or Firm* — Oblon, McClelland, Maier & Neustadt, L.L.P.

(57) ABSTRACT

A method for providing to a wearer a customized progressive spectacle ophthalmic lens, comprising providing a residual astigmatism target value for the progressive spectacle ophthalmic lens-eye system according to a reference point, calculating a correction function, combining the correction function to the front or to the back surface of an initial optical data of an initial progressive spectacle ophthalmic lens.

14 Claims, 7 Drawing Sheets

(56) References Cited

U.S. PATENT DOCUMENTS

| | | | |
|---|---|---|---|
| 2012/0147324 A1* | 6/2012 | Marin | G02C 7/02 |
| | | | 351/159.76 |
| 2013/0107204 A1 | 5/2013 | Spratt et al. | |
| 2013/0335699 A1* | 12/2013 | De Rossi | G02C 7/025 |
| | | | 351/159.42 |
| 2014/0293216 A1* | 10/2014 | Muradore | G02C 7/028 |
| | | | 351/159.42 |
| 2017/0108710 A1* | 4/2017 | Guilloux | G02C 7/028 |

* cited by examiner

METHOD FOR PROVIDING TO A WEARER A CUSTOMIZED PROGRESSIVE SPECTACLE OPHTHALMIC LENS

RELATED APPLICATIONS

This is a U.S. national stage application under 35 USC § 371 of International application No. PCT/EP2014/068191 filed on Aug. 27, 2014. This application claims the priority of European application no. 13306605.0 filed Nov. 25, 2013, the entire content of which is hereby incorporated by reference.

FIELD OF THE INVENTION

The invention relates generally to the field of vision improvement and more specifically concerns a method for providing to a wearer a customized progressive spectacle ophthalmic lens. The said method is implemented by computer means. The invention also concerns a method for making a progressive spectacle ophthalmic lens. Furthermore, the invention concerns a piece of software set up for implementing method for providing to a wearer a customized progressive spectacle ophthalmic lens of the invention.

BACKGROUND OF THE INVENTION

Progressive spectacle ophthalmic lenses are worn and widely used for correcting many different types of vision deficiencies such as near-sightedness (myopia) or far-sightedness (hypermetropia), astigmatism, and defects in near-range vision usually associated with aging (presbyopia).

Ophthalmologists or optometrists routinely improve the visual acuity by correcting refractive errors in terms of sphere, cylinder, axis and addition.

SUMMARY OF THE INVENTION

A problem that the invention aims to solve is to better meet the visual needs of lens users and improve the comfort of progressive spectacle ophthalmic lens users, to facilitate their adapting to the lenses and to lower swing effects.

For this purpose, one aspect of the invention is directed to a method implemented by computer means for providing to a wearer a customized progressive spectacle ophthalmic lens, said customized progressive spectacle ophthalmic lens being characterized by a set of optical data (COD), the said method comprising:

a) providing the prescription data of the wearer, said prescription data comprising the sphere, cylinder, axis and addition (Add) prescribed values for said wearer, the wearing conditions for the wearer and the coma of the eye of the wearer;

b) providing an initial optical data (IOD) characterizing an initial progressive spectacle ophthalmic lens suitable to fulfil the requirements of the prescription data of the wearer, comprising a front surface and a back surface, a far vision point $(x\_VL, y\_VL)$, a near vision point $(x\_VP, y\_VP)$ and a meridian line representing the locus of mean points of a wearer when he is looking from far to near vision points;

c) choosing a reference point $(x\_ref, y\_ref)$ on the meridian line of the initial progressive spectacle ophthalmic lens;

d) calculating the residual astigmatism of the initial progressive spectacle ophthalmic lens-eye system when the eye of the wearer is looking through the reference point, $AR\_ini(x\_ref; y\_ref)$, and the residual coma of the initial progressive spectacle ophthalmic lens-eye system when the eye of the wearer is looking through to the reference point, $CR\_ini(x\_ref; y\_ref)$;

e) calculating a residual astigmatism target value for the progressive spectacle ophthalmic lens-eye system according to the reference point, $AR\_cib(x\_ref; y\_ref)$, thanks to following equation:

$$|AR\_cib(x\_ref; y\_ref)| = S \times |CR\_ini(x\_ref; y\_ref)|,$$

where $0.5 \leq S \leq 3$ and where the values of $AR\_cib$ and $CR\_ini$ are in μm;

f) calculating a correction function, $SUR\_cor(x;y)$, according to following steps:
  calculating $AR\_cor(x\_ref; y\_ref)$ according to following equation:

$$AR\_cor(x\_ref; y\_ref) = AR\_cib(x\_ref; y\_ref) - AR\_ini(x\_ref; y\_ref)$$

determining the radius, $R\_cor$, of the toroidal surface having the said $AR\_cor(x\_ref; y\_ref)$ value at the point $(x\_ref; y\_ref)$;
  calculating $SUR\_cor(x;y)$ as being the points of said toroidal surface;

g) calculating the customized optical data (COD) of the customized progressive spectacle ophthalmic lens by combining the correction function $SUR\_cor(x;y)$ to the front or to the back surface of initial optical data (IOD) of the initial progressive spectacle ophthalmic lens;

and wherein $(x,y)$ are geometrical coordinates on a surface.

The inventors have discovered that one can combine an initial progressive spectacle ophthalmic lens surface with a toroidal surface that allow reducing unwanted astigmatism without degrading the wearing comfort for the wearer, namely the acuity, when selecting the feature of said toroidal surface according to the teaching of the present invention.

They have demonstrated that thanks to the here above method, the comfort of a wearer is significantly improved when comparing to the initial progressive spectacle ophthalmic lens suitable to fulfil the requirements of the prescription data of the wearer.

Swim effects are namely lowered thanks to lateral residual astigmatisms of the progressive spectacle ophthalmic lens-eye system reduction.

According to different embodiments of the present invention, that may be combined:
- the reference point on the meridian line of the initial progressive spectacle ophthalmic lens is chosen within the list consisting of the far vision point, the fitting point, the near vision point;
- S is equal to 1;
- the coma of the eye of the wearer is measured straight-away, in far vision conditions; according to another embodiment, the coma of the eye of the wearer is measured in near vision conditions;
- the coma of the eye of the wearer is measured for an eye pupil comprised between 2 and 8 mm, for example equal to 5 mm;
- the initial optical data (IOD) characterizing the initial progressive spectacle ophthalmic lens is obtained thanks to a standard progressive spectacle ophthalmic lens design and to the prescription data of the wearer; according to another embodiment, the initial optical data (IOD) characterizing the initial progressive spectacle ophthalmic lens is obtained thanks to optimisation of a progressive spectacle ophthalmic lens according to the prescription data of the wearer and to wearer specific parameters, such as for example eye-head coefficient, progression length, wearing conditions;
the wearing conditions are standard wearing conditions where the position of the lens with relation to the eye of the wearer is defined by a pantoscopic angle of −8 [deg.], a lens-pupil distance of 14 mm, a pupil-eye rotation center of 11.5 mm and a wrap angle of 0 [deg.];
steps f) and g) of the present method consist of:
f) step f) further comprises a substep f2) consisting of:
f2) calculating a second correction function, SUR_cor2(x;y):
wherein SUR_cor2(x;y)=F(x;y);
g) calculating the customized optical data (COD) of the customized progressive spectacle ophthalmic lens by combining the correction function SUR_cor(x;y) and the second correction function SUR_cor2(x;y) to the front or to the back surface of initial optical data (IOD) of the initial progressive spectacle ophthalmic lens,
where F is chosen within the list consisting of:
a sphere function;
an atorization function;

$$F(x; y) = -S \times \text{Add} \times C_1 \times e^{\frac{-2(y-(y_{VP}-y_{VL})/2)^2}{(y_{VP}-y_{VL})^2}}$$

where $0.02 \leq C_1 \leq 1$ ($C_1$ in μm/D);

$$F(x; y) = -S \times C_2 \times (y - y_{VL}) \times \frac{(2.5 - \text{Add})}{(y_{VP} - y_{VL})},$$

where $-1 \leq C_2 \leq 1$ and $C_2 \neq 0$ ($C_2$ in μm);
a combination of two or more preceding functions;
combining a correction function with a surface of initial optical data consists in:
determining the surface coordinates (x,y,z) associated to the correction function and the surface coordinates (x,y,z') of initial optical data at the same (x,y) coordinates;
defining a combined surface (x,y,z+z') as the customized optical data (COD) of the customized progressive spectacle ophthalmic lens.
Another aspect of the invention relates to a method for manufacturing a progressive spectacle ophthalmic lens for a wearer, the method comprising the following steps:
aa) providing a customized optical data (FOS) according to any of preceding claims;
bb) providing a lens substrate;
cc) manufacturing the spectacle ophthalmic lens according to the customized optical data (FOS).
According to different embodiments, said method for manufacturing incorporates the previously described features and the different embodiments of the preceding method for providing to a wearer a customized progressive spectacle ophthalmic lens.
Another aspect of the invention relates to a computer program product comprising one or more stored sequence of instruction that is accessible to a processor and which, when executed by the processor, causes the processor to carry out at least one of the steps of the different embodiments of the preceding methods.
Another aspect of the invention relates to a computer-readable medium carrying one or more sequences of instructions of the preceding computer program product.

Definitions

Surface coordinates (x,y,z): progressive spectacle ophthalmic lenses comprise two micro-markings spaced one from the other from 34 mm that have been made mandatory by a harmonized standard ISO 8990-2. According to said standard, the micro-markings are equidistant when considering a vertical plane passing by the fitting point or by the prism reference point. The center of the surface (x=0, y=0) is the point of the surface at which the normal N to the surface intersect the center of the segment linking the two micro-markings. The center of the referential is the center of the surface x=0 mm, y=0 mm. According to another embodiment one can define a referential center thanks to temporary markings that may also be applied on the surface of the lens, indicating positions of control points on the lens, such as a control point for far vision, a control point for near vision, a prism reference point and a fitting point for instance. If the temporary markings are absents or have been erased, it is always possible to a skilled person to position the control points on the lens by using a mounting chart and the permanent micro-markings. The micro-markings also make it possible to define referential for both surfaces of the lens. The "z" value corresponds to the altitude of the surface when considering the plane (x=0,y=0) as a reference plane.

Far vision point, near vision point, fitting point, are commonly known points in the field of progressive spectacle ophthalmic lens and are defined in standard ISO 13666: 1998:

Far vision point, also called distance reference point or major reference point, is the point on the front surface of the lens at which the dioptric power for the distance portion apply.

Near vision point, also called near design reference point, is the point, stipulated by the manufacturer, on the front surface of a finished lens or on the finished surface of a lens blank at which the design specifications for the near portion apply.

Fitting point is the point on the front surface of a lens or semifinished lens blank stipulated by the manufacturer as a reference point for positioning the lens in front of the eye.

In the frame of the present invention a "design" of a spectacle ophthalmic lens has to be understood as the part of the optical system of said lens which is not determined by the wearer standard prescription parameters consisting of sphere, cylinder, axis and power addition values determined for said wearer.

Both astigmatism and coma features related data comprise a "value" and a "direction" data. The "value" data relates to the maximum amplitude of the feature and the direction relates to the angle of said feature.

In the frame of the present invention, the values signs and variations are expressed according to OSA recommendations, as described in the following standard: "American National Standard for Ophthalmics—Methods for reporting optical aberrations of the eye"; 2004:ANSI Z80.28-2004.

In the frame of the present invention, a "lens-eye system" is an optical system taking into account ray paths from objects to be seen to the centre of the eye and passing through the lens. Standard vision conditions are considered. One can therefore use an "ergorama" which is a function linking the usual distance of object points with each gaze direction.

According to an embodiment of the present invention, the wearer's eye is the actual eye of a wearer and the customized progressive spectacle ophthalmic lens is customized for said wearer. According to this embodiment the coma of the eye of the wearer is measured. Said data may be obtained when using an aberrometer.

According to another embodiment of the present invention, the wearer is a virtual wearer and the wearer's eye is a model eye. Examples of a "models eye" are disclosed in the publication "Finite schematic eye models and their accuracy to in-vivo data"—Ravi C. Bakaraju; Klaus Ehrmann; Eric Papas; Arthur Ho—Vision Research 48 (2008) 1681-1694. According to an embodiment of the present invention, the chosen "model eye" is a "Navarro et al." model eye as disclosed in "Accommodation-dependent model of the human eye with aspherics"—Navarro R.; Santamaria J. & Bescos J. (1985)—Journal of the Optical Society of America A, 2(8) 1273-1281. Coma value of a model eye is chosen for example as being 0.18 μm for a pupil of 5 mm.

Coma is determined for a pupil size. One can easily determine the coma for different pupil size. According to an embodiment the transformation of a pupil size to another is made according to the teaching of L. Lundström and P. Unsbo (Biomedical and X-ray Physics, Royal Institute of Technology, Sweden) "Transformation of Zernike coefficients: scaled, translated, and rotated wavefronts with circular and elliptical pupils"—Vol. 24, n° 3/March 2007/J. Optical Society of America.

According to an embodiment, coma is determined thanks to a wavefront measurement that can be analysed using Zernike polynomials. Such an analysis is for example recommended by the Optical Society of America (OSA) for describing ocular wavefront aberrations, but other polynomials, such as for example Taylor series or splines can also be used to mathematically describe a wavefront.

The Zernike expansion presents the aberrations in an orthogonal set of polynomials. It can be displayed in the form of a pyramid. Vertically each row represents a typical form of aberration; these are called (radial) orders. The top is called the zero order, which actually is no aberration but a constant that can be added for e.g. scaling. The second row (the first order) represents prismatic effects. Each presentation of an aberration is called a term. The prismatic effects are based vertical ($Z\_2$ term, up or down) and horizontal ($Z\_3$ term, in or out). Since the zero and first orders ($Z\_1$-3 terms) are linked to specific visual defects, or to specific measurement conditions, these are usually not pictured. It starts to become interesting as of the second order. In the middle of the pyramid, defocus ($Z\_4$ term) can be found. It is placed at the axis line of the pyramid. This is because defocus (spherical part of a refraction) is rotational symmetric (zero angular frequency). On both sides of defocus, the astigmatic (cylinder in the refraction) terms $Z\_3$ and $Z\_5$ can be found. These are special conditions of defocus because they work in one meridian only. Consequently these must be indicated with a direction (axis of the cylinder), $Z\_3$ for oblique astigmatism and $Z\_5$ for horizontal astigmatism. The third order aberrations include coma and trefoil, each has a direction, so no Z term in this row at the middle. Coma values and orientation data relate to $Z\_7$ and $Z\_8$ terms. $Z\_7$ is the horizontal component of the coma and $Z\_8$ is the vertical component of the coma; thus the coma value is $(Z\_7^2 + Z\_8^2)^{1/2}$ and the angle of the coma direction, CA, is artan($Z\_8/Z\_7$). Next are 5 terms of the 4th order. Spherical aberrations ($Z\_12$) is rotational symmetric, the other terms (with a direction) are secondary astigmatism and tetra foil. For describing aberrations in optics the pyramid continues with many more orders and terms. Usually these are in the eye not present or very low. Even within the 14 Z terms as discussed not all terms are of equal importance to the eye. For the eye the second order aberrations are called "low order aberrations" and include the sphere and cylinder value of the refraction. Third orders and above are called "higher order aberrations".

Aberrometers, that are wavefront sensors for the specific measurement of the eye, are instruments designed to measure the wavefront of the eye, including sphere, cylinder and the higher-order aberrations.

Using such instrument makes possible to measure and/or calculate the aberrations level of an eye and separate the contribution of low and higher order aberrations, namely the coma. An aberrometer is designed to measure the wavefront of the eyes including sphere, cylinder, and the higher-order aberrations. Shack-Hartmann aberrometry is known as the most popular way to measure aberrations of the human eye in use today. Commercial ophthalmic Shack-Hartmann aberrometers are for example sold by Abbot Medical Optics, VISX, ALCON, Imagine Eyes (see for example irx3 aberrometer).

Said aberrometers measure the wavefront shape by measuring the distance between the wavefront surface refracted by an eye's optic and a reference plane located in the eye's entrance pupil. This distance is known as the wavefront error. A Shack-Hartmann data set consists of a large array of numbers (wavefront errors) for different position on the pupil plane. As a whole, the entire data set is called the wavefront.

In order to determine the radius, R_cor, of the toroidal surface having AR_cor(x_ref;y_ref) value at the point (x_ref;y_ref), one can use following metrics:
One define a (x',y') referential and the general equation of a toroidal surface:

$$\begin{cases} x' = x\cos\theta - y\sin\theta \\ y' = x\sin\theta + y\cos\theta \end{cases}$$

$$Z = R - \sqrt{R^2 - x'^2}$$

where θ is the axis of torus and R is the radius of the torus. One determine R and θ to obtain the desired AR_cor(x_ref; y_ref)at(x_ref;y_ref)point;
Calculating SUR_cor(x;y) can then be made according to the same equations in every (x;y) points when R and θ are known.

Unless specifically stated otherwise, as apparent from the following discussions, it is appreciated that throughout the specification discussions utilizing terms such as "computing", "calculating" "generating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

The features of the present invention, as well as the invention itself, both as to its structure and its operation, will be best understood from the accompanying non limiting drawings and examples, taken in conjunction with the accompanying description, in which.

DETAILED DESCRIPTION OF THE DRAWINGS

Figure 1:
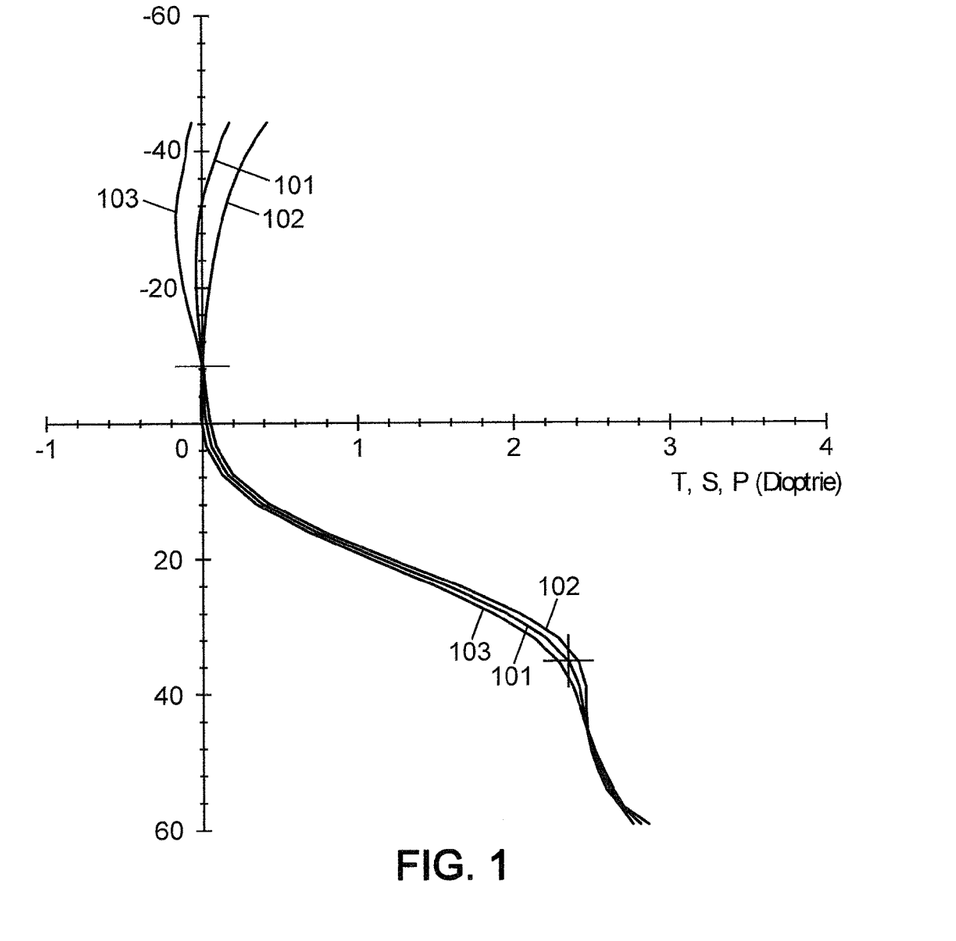
FIGS. 1 to 3 relates an initial progressive spectacle ophthalmic lens-eye system.
Figure 2:
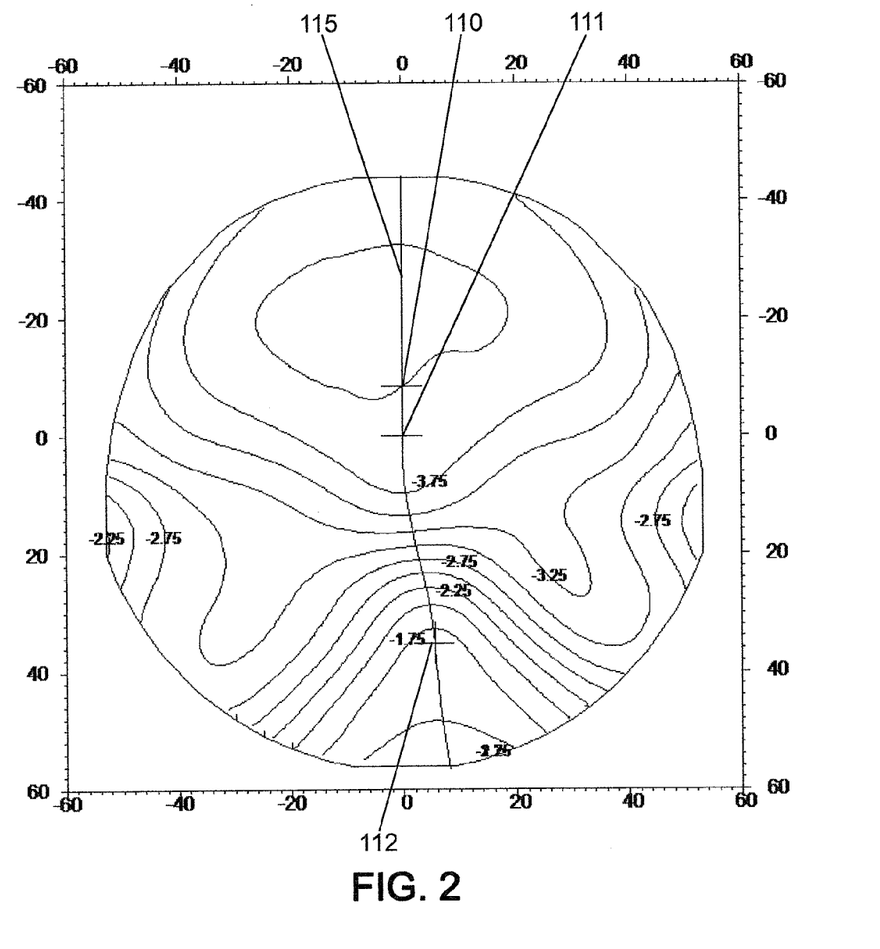
Figure 3:
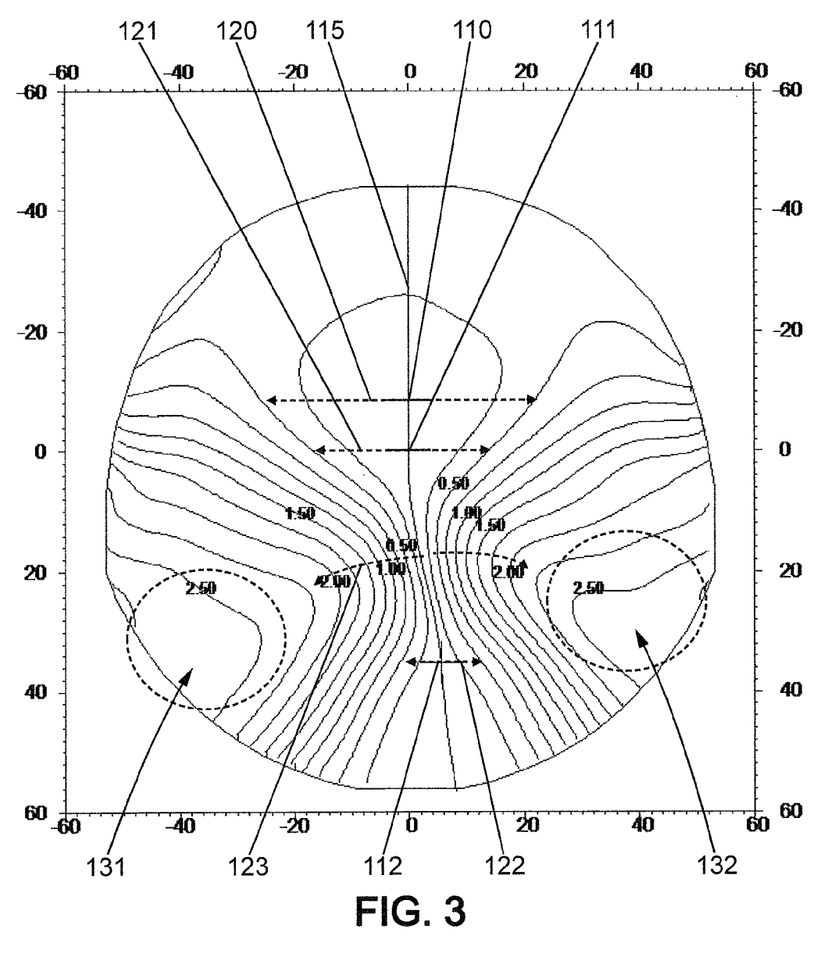

According to an example of the present invention:
Prescription data of the wearer are following:
sphere=−4 D
cylinder=0
axis=0
addition (Add)=2 D
The coma of the eye of the wearer is 0.18 µm for a pupil diameter of 5 mm.
The initial progressive spectacle ophthalmic lens suitable to fulfil the requirements of the prescription data of the wearer is a progressive spectacle ophthalmic lens according to an ESSILOR Company design. Said design is illustrated by FIGS. 1 to 3.
The reference point (x_ref;y_ref) is the fitting point.
The residual astigmatism target value for the progressive spectacle ophthalmic lens-eye system is calculated according to the reference point, AR_cib(x_ref;y_ref), thanks to following equation:

$$|AR_{cib}(x\_ref;y\_ref)|=|CR_{ini}(x\_ref;y\_ref)|,$$

meaning that S=1;

The correction function is combined with the front surface of initial optical data thanks to:

determining the surface coordinates (x,y,z) associated to the correction function and the surface coordinates (x,y,z') of initial optical data at the same (x,y) coordinates;

defining a combined surface (x,y,z+z') as the customized optical data (COD) of the customized progressive spectacle ophthalmic lens.

FIGS. 1, 2, 3 represent respectively the power profile along the meridian line, the power contour plot and the astigmatism contour plot of the initial progressive spectacle ophthalmic lens suitable to fulfil the requirements of the prescription data of the wearer.

Figure 4:
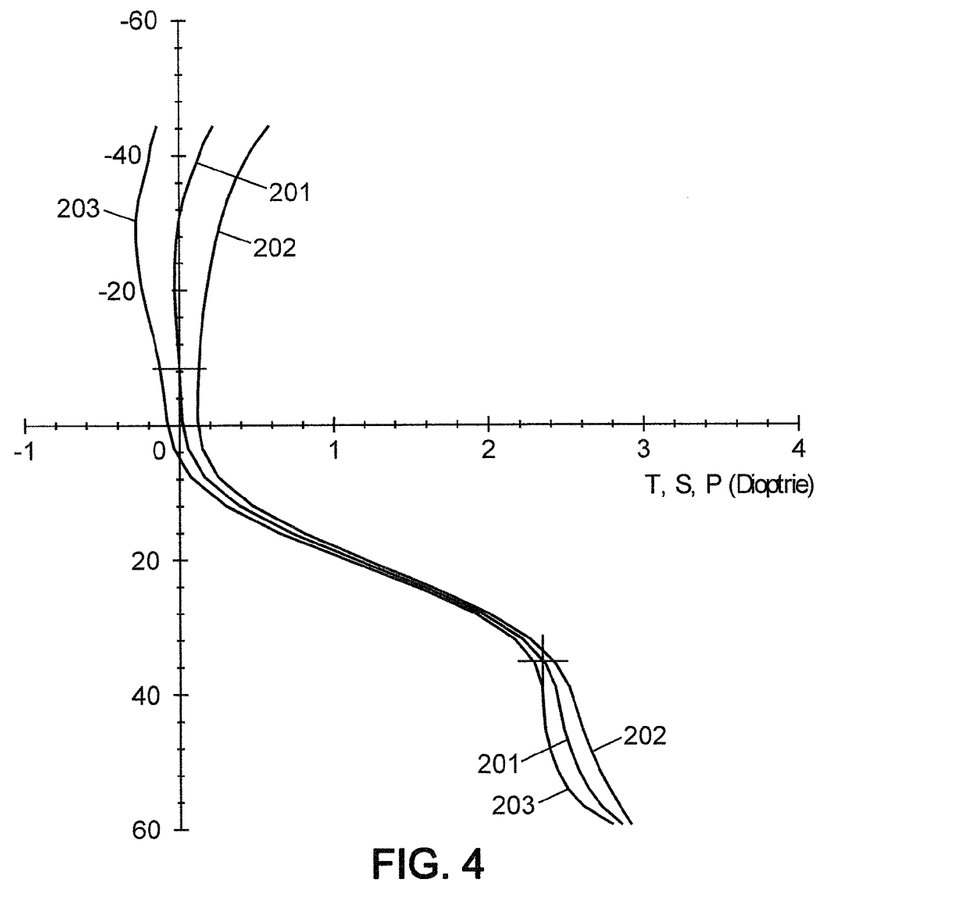
FIGS. 4 to 6 relates to a customized progressive spectacle ophthalmic lens-eye system according to the present invention.
Figure 5:
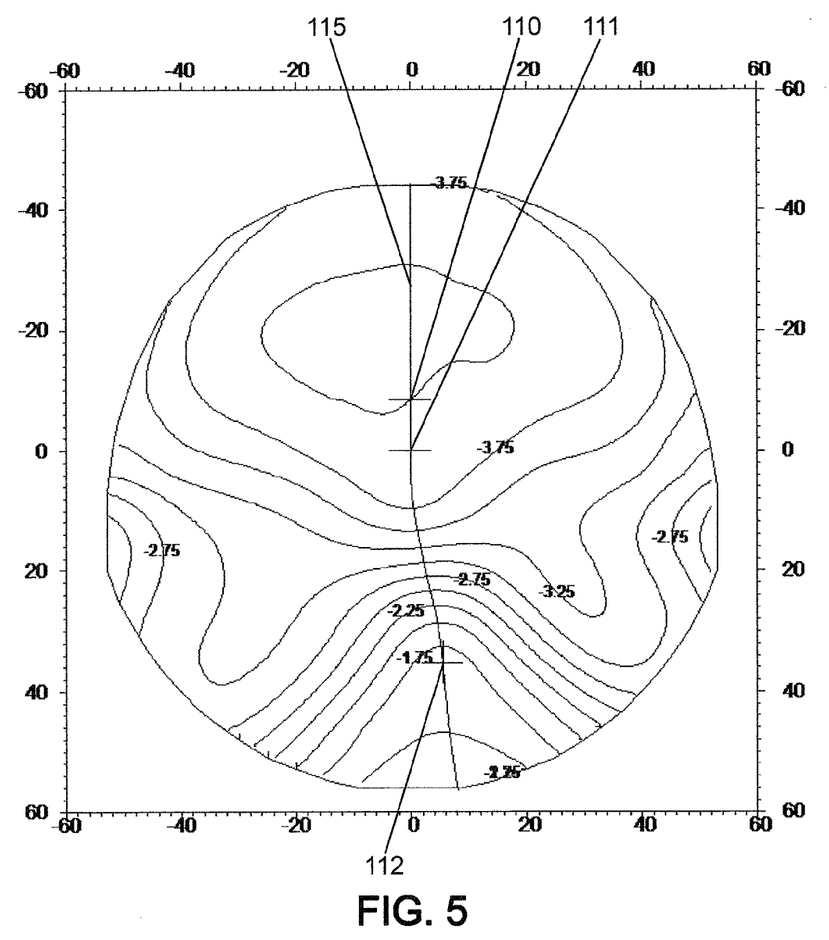
Figure 6:
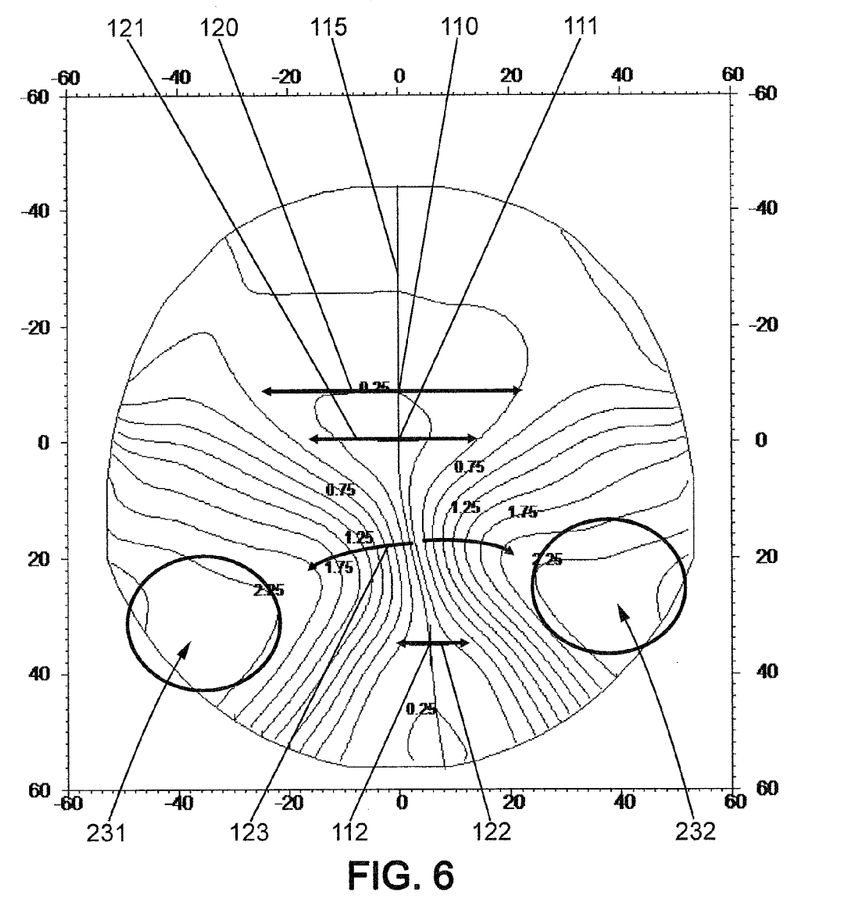

FIGS. 4, 5, 6 represent respectively the power profile along the meridian line, the power contour plot and the astigmatism contour plot of the customized progressive spectacle ophthalmic lens according to the here above mentioned example according to the present invention.

The horizontal axis of FIGS. 1 and 4 indicate the variations of the optical power along the meridian line with respect to the optical power value produced for the gaze direction corresponding to the far vision control point. The vertical axis indicates the values of the eye declination angle $\alpha$, with positive values for eye directions oriented downwards. The reference eye direction is defined for the fitting point. The central curve (101, 201) corresponds to the mean optical power, which is calculated as an average value for planes containing the eye direction and rotated about tins direction. The other curves correspond to the maximum (102, 202) and the minimum (103, 203) optical power value produced in these planes.

FIGS. 2 and 5 are optical power maps. The vertical and horizontal coordinates of the maps are the values of the eye declination angle $\alpha$ and the eye azimuth angle $\beta$. The curves indicated in these maps connect eye directions which correspond to a same optical power value. The respective optical power values for the curves are incremented by 0.25 diopter between neighbouring curves, and are indicated on some of these curves.

FIGS. 3 and 6 are residual astigmatism contour plots, with coordinates similar to those of the optical power maps. The curves indicated connect eye directions corresponding to a same astigmatism value.

On the diagrams following references correspond to followings:

110 is far vision point;
111 is the fitting point;
112 is the near vision point;
115 is the meridian line;
120 is an arrow corresponding to vision field between two iso-astigmatism lines equal to 0.50 diopter, at the level of the far vision point and for the initial progressive spectacle ophthalmic lens;
121 is an arrow corresponding to vision field between two iso-astigmatism lines equal to 0.50 diopter, at the level of the fitting point and for the initial progressive spectacle ophthalmic lens;
122 is an arrow corresponding to vision field between two iso-astigmatism lines equal to 0.50 diopter, at the level of the near vision point and for the initial progressive spectacle ophthalmic lens;
123 is a curved arrow corresponding to vision field between two iso-astigmatism lines in the range of intermediate vision.

Maximum residual astigmatism zones can be seen in zones 131, 132 for FIG. 3 and in zones 231, 232 for FIG. 6.

One can clearly see that maximum residual astigmatism are reduced when comparing FIG. 6 to FIG. 3, namely within zones 231, 232 compared to 131, 132.

One can also see in FIG. 6 that the vision fields between two iso-astigmatism lines are enlarged compared to FIG. 3.

The comfort of a wearer is thus significantly improved when comparing to the initial progressive spectacle ophthalmic lens; swim effects are namely lowered thanks to lateral residual astigmatisms of the progressive spectacle ophthalmic lens-eye system reduction.

Selection of parameter S, used for calculating a residual astigmatism target value for the progressive spectacle ophthalmic lens-eye system according to the reference point, AR_cib(x_ref;y_ref), thanks to following equation:

$$|AR\_cib(x\_ref;y\_ref)|=S\times|CR\_ini(x\_ref;y\_ref)|,$$

has been made thanks to numerous trials and calculations so as to permit combining the correction function SUR_cor(x;y) to the front or to the back surface of initial optical data (IOD) of the initial progressive spectacle ophthalmic lens without degrading the visual performance, namely the acuity, for the wearer.

Acuity can be characterized by the "volume of the MTF", Vol(MTF).

MTF is the function that represents the amplitude of the modulation (or the contrast of a sinusoidal periodic structure) in the image obtained from the object by the optical system for each spatial frequency (see for example: Handbook of lens design, Malacara D. & Malacara Z. pages 295 to 303, 1994 Marcel Dekker Inc.). It is possible to calculate the volume of the MTF, Vol(MTF), by integrating this function over a spatial frequency range that is typically between 0 and infinity.

Many other typical parameters could also be used to discuss acuity and are for example describe in "Accuracy and precision of objective refraction from wavefront aberrations", Larry N. Thibos, Xin Hong, Arthur Bradley, Raymond A. Applegate, Journal of Vision (2004) 4, see pages 329 to 351.

Figure 7:
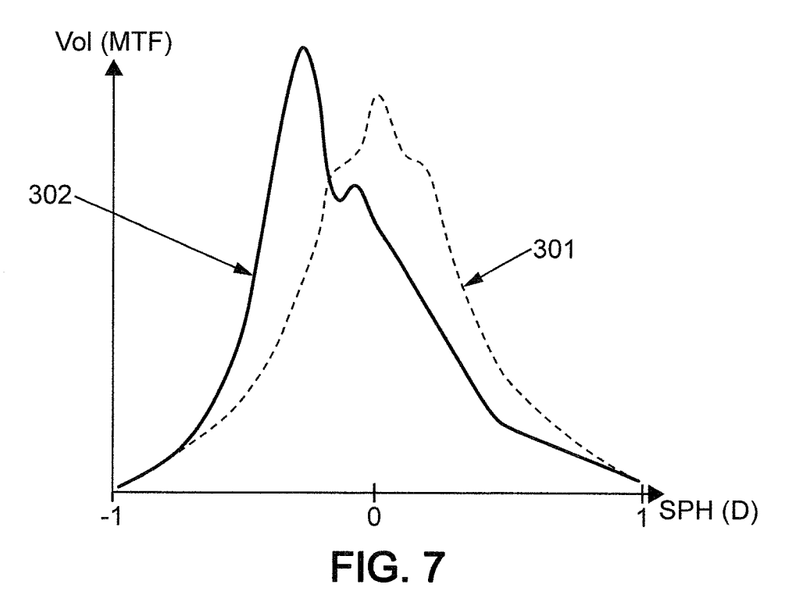
FIG. 7 is a diagram showing the variation of Vol(MTF) according to the defocus sphere value for an initial progressive spectacle ophthalmic lens-eye system and for a customized progressive spectacle ophthalmic lens-eye system according to the present invention.

FIG. 7 shows the variation curves of Vol(MTF) (301, 302) according to the defocus sphere value, SPH, within the range $-1\leq SPH\leq 1$, respectively for the initial progressive spectacle ophthalmic lens-eye system of preceding example (corresponding to FIGS. 1 to 3) and for a customized progressive spectacle ophthalmic lens-eye system according to the present invention (corresponding to FIGS. 4 to 6). The coma of the eye of the wearer is 0.18 µm for a pupil diameter of 5 mm.

Parameter S=1 has been chosen for said example according the invention; one can clearly see that it exists defocus values for which the Vol(MTF) of the progressive spectacle ophthalmic lens-eye system according to the present invention is almost comparable and even better to the one of the initial progressive spectacle ophthalmic lens-eye system.

The inventors have demonstrated that choosing a range $0.5\leq S\leq 3$ is suitable to obtain good acuity performances for the wearer.

Thus, thanks to the teaching of the present invention one can customize an initial progressive spectacle ophthalmic lens, lower swim effects and maintain or even enhance acuity of the lens-eye system of the customized progressive spectacle ophthalmic lens and the wearer's eye.

The invention has been described above with the aid of embodiments without limitation of the general inventive concept.

The invention claimed is:

1. A method implemented by a computer for providing to a wearer a customized progressive spectacle ophthalmic lens and for manufacturing said customized progressive spectacle ophthalmic lens, said customized progressive spectacle ophthalmic lens being characterized by a set of optical data, the method comprising:
   a) providing prescription data of the wearer, said prescription data comprising the sphere, cylinder, axis and addition (Add) prescribed values for said wearer, wearing conditions for the wearer and coma of an eye of the wearer;
   b) providing initial optical data characterizing an initial progressive spectacle ophthalmic lens suitable to fulfill requirements of the prescription data of the wearer, comprising a front surface and a back surface, a far vision point (x_VL,y_VL), a near vision point (x_VP, y_VP) and a meridian line representing locus of mean points of the wearer when the wearer is looking from far to near vision points;
   c) choosing a reference point (x_ref;y_ref) on the meridian line of the initial progressive spectacle ophthalmic lens;
   d) calculating residual astigmatism of the initial progressive spectacle ophthalmic lens-eye system when the eye of the wearer is looking through the reference point, AR_ini(x_ref;y_ref), and calculating the residual coma of the initial progressive spectacle ophthalmic lens-eye system when the eye of the wearer is looking through to the reference point, CR_ini(x_ref;y_ref);
   e) calculating a residual astigmatism target value for the progressive spectacle ophthalmic lens-eye system at the reference point, AR_cib(x_ref;y_ref), based on the following equation:

$$|AR\_cib(x\_ref;y\_ref)|=S\times|CR\_ini(x\_ref;y\_ref)|,$$

where S is a selected parameter satisfying $0.5\leq S\leq 3$ and where the values of AR_cib and CR_ini are in µm;
   f) calculating a correction function, SUR_cor(x;y), according to following steps:
      (i) calculating AR_cor(x_ref;y_ref) according to following equation:

$$AR\_cor(x\_ref;y\_ref)=AR\_cib(x\_ref;y\_ref)-AR\_ini(x\_ref;y\_ref)$$

(ii) providing a toroidal surface having the AR_cor (x_ref;y_ref) value at the reference point (x_ref; y_ref);
      (iii) determining radius, R_cor, of the toroidal surface having the AR_cor(x_ref;y_ref) value at the reference point (x_ref;y_ref);
      (iv) calculating SUR_cor(x;y) as being all points of said toroidal surface;
   g) calculating the customized optical data of the customized progressive spectacle ophthalmic lens by combining the correction function SUR_cor(x;y) to the front or to the back surface of initial optical data of the initial progressive spectacle ophthalmic lens;
   wherein (x,y) are geometrical coordinates on a surface; and
   h) manufacturing the customized progressive spectacle ophthalmic lens according to the customized optical data calculated in step g).

2. The method according to claim 1, wherein the reference point on the meridian line of the initial progressive spectacle ophthalmic lens is chosen within a list consisting of the far vision point, a fitting point, the near vision point.

3. The method according to claim 1, wherein S is equal to 1.

4. The method according to claim 1, wherein the coma of the eye of the wearer is measured in far vision conditions.

5. The method according to claim 1, the coma of the eye of the wearer is measured in near vision conditions.

6. The method according to claim 1, wherein the coma of the eye of the wearer is measured for an eye pupil comprised between a 2 and 8 mm diameter.

7. The method according to claim 1, wherein the initial optical data characterizing the initial progressive spectacle ophthalmic lens is obtained based on a progressive spectacle ophthalmic lens design and based on the prescription data of the wearer.

8. The method according to claim 1, wherein the initial optical data characterizing the initial progressive spectacle ophthalmic lens is obtained based on optimisation of a progressive spectacle ophthalmic lens according to the prescription data of the wearer and to wearer specific parameters.

9. The method according to claim 1, wherein the wearing conditions for the wearer which are included in said prescription data comprise a position of the lens with relation to the eye of the wearer determined by a pantoscopic angle of −8 [deg.], a lens-pupil distance of 14 mm, a pupil-eye rotation center of 11.5 mm and a wrap angle of 0 [deg.].

10. The method according to claim 1, wherein steps f) and g) consist of:
step f) further comprises a substep f2) consisting of:
  f2) calculating a second correction function, SUR_cor2 (x;y):
  wherein SUR_cor2(x;y)=F(x;y);
wherein step g) comprises calculating the customized optical data of the customized progressive spectacle ophthalmic lens by combining the correction function SUR_cor(x;y) and the second correction function SUR_cor2(x;y) to the front or to the back surface of initial optical data of the initial progressive spectacle ophthalmic lens,
where F is chosen within a list consisting of:
a sphere function;
an atorization function;

$$F(x; y) = -S \times \text{Add} \times C_1 \times e^{\frac{-2(y-(y_{VP}-y_{VL})/2)^2}{(y_{VP}-y_{VL})^2}}$$

where $0.02 \leq C_1 \leq 1$, C1 being a coefficient expressed in μm/D;

$$F(x; y) = -S \times C_2 \times (y - y_{VL}) \times \frac{(2.5 - \text{Add})}{(y_{VP} - y_{VL})},$$

where $-1 \leq C_2 \leq 1$ and $C_2 \neq 0$, C2 being a coefficient expressed in μm;
a combination of two or more preceding functions.

11. The method according to claim 1, wherein combining a correction function with a surface of initial optical data comprises:
determining the surface coordinates x,y,z associated to the correction function and the surface coordinates x,y,z' of initial optical data at the same x,y coordinates;
defining a combined surface x,y,z+z' as the customized optical data of the customized progressive spectacle ophthalmic lens.

12. A non-transitory computer-readable storage medium including computer executable instructions, wherein the instructions, when executed bu a processor, cause the processor to perform a method for providing to a wearer a customized progressive spectacle ophthalmic lens and for manufacturing said customized progressive spectacle ophthalmic lens, said customized progressive spectacle ophthalmic lens being characterized by a set of optical data, the method comprising:
a) providing prescription data of the wearer, said prescription data comprising the sphere, cylinder, axis and addition (Add) prescribed values for said wearer, wearing conditions for the wearer and coma of an eye of the wearer;
b) providing initial optical data characterizing an initial progressive spectacle ophthalmic lens suitable to fulfill requirements of the prescription data of the wearer, comprising a front surface and a back surface, a far vision point (x_VL,y_VL), a near vision point (x_VP, y_VP) and a meridian line representing locus of mean points of the wearer when the wearer is looking from far to near vision points;
c) choosing a reference point (x_ref;y_ref) on the meridian line of the initial progressive spectacle ophthalmic lens;
d) calculating residual astigmatism of the initial progressive spectacle ophthalmic lens-eye system when the eye of the wearer is looking through the reference point, AR_ini(x_ref;y_ref), and calculating the residual coma of the initial progressive spectacle ophthalmic lens-eye system when the eye of the wearer is looking through to the reference point, CR_ini(x_ref;y_ref);
e) calculating a residual astigmatism target value for the progressive spectacle ophthalmic lens-eye system at the reference point, AR_cib(x_ref;y_ref), based on the following equation:

|AR_cib(x_ref;y_ref)|=S×|CR_ini(x_ref;y_ref)|, where S is a selected parameter satisfying $0.5 \leq S \leq 3$ and where the values of AR_cib and CR_ini are in μm;
f) calculating a correction function, SUR_cor(x;y), according to following steps:
  (i) calculating AR_cor(x_ref;y_ref) according to following equation:

AR_cor(x_ref;y_ref)=AR_cib(x_ref;y_ref)−AR_ini (x_ref;y_ref)

(ii) providing a toroidal surface having the AR_cor (x_ref;y_ref) value at the reference point (x_ref; y_ref);
  (iii) determining radius, R_cor, of the toroidal surface having the AR_cor(x_ref;y_ref) value at the reference point (x_ref;y_ref);
  (iv) calculating SUR_cor(x;y) as being all points of said toroidal surface;
g) calculating the customized optical data of the customized progressive spectacle ophthalmic lens by combining the correction function SUR_cor(x;y) to the front or to the back surface of initial optical data of the initial progressive spectacle ophthalmic lens;
wherein (x,y) are geometrical coordinates on a surface; and
h) manufacturing the customized progressive spectacle ophthalmic lens according to the customized optical data calculated in step g).

13. The method according to claim 1, wherein the coma of the eye of the wearer is measured for an eye pupil equal to 5 mm in diameter.

14. The method according to claim 8, wherein said wearer specific parameters comprise eye-head coefficient, progression length, and the wearing conditions.

\* \* \* \* \*